(12) United States Patent
Oh

(10) Patent No.: US 6,206,312 B1
(45) Date of Patent: Mar. 27, 2001

(54) FLY FISHING REEL WITH DETACHABLE SPOOL SHAFT SUPPORTING PLATE

(75) Inventor: Chul Suk Oh, Seoul (KR)

(73) Assignee: Shin A Sports Co., Ltd., Ichon (KR)

( * ) Notice: Subject to any disclaimer, the term of this patent is extended or adjusted under 35 U.S.C. 154(b) by 0 days.

(21) Appl. No.: 09/599,222

(22) Filed: Jun. 22, 2000

(51) Int. Cl.$^7$ ................................................. A01K 89/015
(52) U.S. Cl. ........................ 242/314; 242/317; D22/141
(58) Field of Search .................................. 242/310, 317, 242/312, 313, 314; D22/140, 141

(56) References Cited

U.S. PATENT DOCUMENTS

| | | | | |
|---|---|---|---|---|
| 731,226 | * | 6/1903 | Rockwell | 242/314 |
| 1,189,232 | * | 7/1916 | Benjamin | 242/312 |
| 4,796,831 | * | 1/1989 | Sheppard | 242/262 |
| 5,120,002 | * | 6/1992 | Kawai | 242/314 |
| 5,137,227 | * | 8/1992 | Allis et al. | 242/312 |
| 5,149,010 | * | 9/1992 | Bacher | 242/312 |
| 5,370,331 | * | 12/1994 | Sato | 242/313 |
| 5,429,318 | * | 7/1995 | Sato | 242/314 |

\* cited by examiner

*Primary Examiner*—Emmanuel M. Marcelo
(74) *Attorney, Agent, or Firm*—Welsh & Katz, Ltd.

(57) ABSTRACT

Disclosed is a fly fishing reel including a reel frame, a spool disposed into the reel frame, and a spool shaft supporting plate detachably mounted on one open end of the reel frame, the reel frame comprising a radial guide channel in an inner circumference of the open end, a plurality of recesses formed around the glide channel at predetermined intervals to interrupt the guide channel, and snap portions formed around the guide channel in radial and outward directions between the recesses. The spool shaft supporting plate includes a plurality of plate springs in one side contacting the open end of the reel frame, and each of the plate springs includes a circular head, a fixed portion for preventing a lateral movement of the plate spring, and a resilient neck portion connecting the head to the fixed portion, the head being moved radially and inwardly by an external force, and being returned to on original position as soon as the external force is removed.

4 Claims, 2 Drawing Sheets

FLY FISHING REEL WITH DETACHABLE SPOOL SHAFT SUPPORTING PLATE

BACKGROUND OF THE INVENTION

1. Field of the Invention

The present invention relates to a fishing reels and more particularly to a fly fishing reel having a structure for detachably mounting a spool shaft supporting plate oil a reel frame.

2. Description of the Prior Art

In general, the fly fishing reel is used for catching various kinds of fishes such as salmon, muskellunge and trout. Such fish generally weighs at least 2–6 pounds, and thus is expected to escape a long distance away when caught on a fishing hook.

Recently, a multiplier type fly fishing reel has been preferably used, which is able to withdraw a fishing line rapidly after the caught fish escapes a long distance away. As is well known in the art, the multiplier type fly fishing reel has a crank handle, and the ratio of the rotational speed of a spool to that of the crank handle is 2:1 to 4:1. The multiplier type fly fishing reel also includes a spool shaft supporting plate fixed securely to one open side, and a cover plate fixed detachably to the other open side. The cover plate comprises a drive gear and the crank handle rotating the drive gear, U.S. Pat. No. 4,796,831 granted to William G. Shepherd on Jan. 10, 1989 discloses the multiplier type fly reel, having the construction as descrived above.

In the multiplier type fly fishing reel, the cover plate is mounted to a reel frame by engaging a peripheral recess thereof with a protruding stud formed on a mounting reel of the reel frame. Since the cover plate, however, is influenced by the rotation of the crank handle mounted on the side thereof, the cover plate cannot keep a positive engagement with the reel frame.

Moreover, a multiplier type gear cluster with a first gear and a second gear is provided in the open side of the reel fin me where the cover plate is mounted. The first gear engages with a driving gear of the cover plate, and the second gear with a pinion formed onto a spool shaft. Thus, it is difficult to mount the cover plate on the reel frame in a state that the first and the second gears are engaged with tile driving gear and the pinion, respectively,

SUMMARY OF THE INVENTION

It is an object of the present invention to solve the problems involved in the prior art, and to provide a fly fishing reel capable of easily replacing a spool mounted on a reel frame.

To accomplish the above object, the present invention provides a fly fishing reel having a reel frame, a spool disposed into the reel frame, and a spool shaft supporting plate detachably mounted on one open end of the reel frame, the reel frame comprising a radial guide channel in an inner circumference of the open end, a plurality of recesses formed around the guide channel at predetermined intervals to interrupt the guide channel, and snap portions formed around the guide channel in radial and outward directions between the recesses, The spool shaft supporting plate includes a plurality of plate springs in one side contacting the open end of the reel frame, and each of the plate springs includes a circular head, a fixed portion for preventing a lateral movement of the plate spring, and a resilient neck portion connecting the head to the fixed portion, the head being moved radially and inwardly by an external force, and being returned to an original position as soon as the external force is removed, The plate spring is fixed by first and second bosses provided in an open end of the spool shaft supporting plate. A gap is formed between the first boss and the second boss adjacent to the first boss. The head of the plate spring is protruded diametrically and outwardly from the spool shaft supporting plate through the gap, and moved into the gap if the external force is applied in a clockwise or counterclockwise direction.

BRIEF DESCRIPTION OF THE DRAWINGS

The above object, other features and advantages of the present invention will become more apparent by describing the preferred embodiment thereof with, reference to the accompanying drawings, in which.

DETAILED DESCRIPTION OF THE PREFERRED EMBODIMENT

Figure 1:
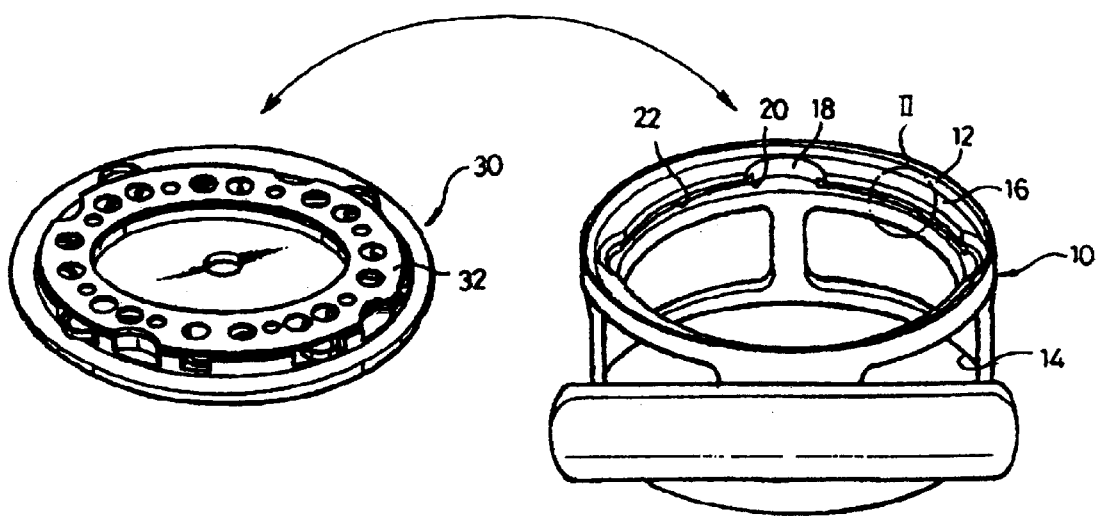
FIG. 1 is a perspective view illustrating a reel frame and a spool shaft supporting plate according to the preferred embodiment of the present invention.

FIG. 1 shows a whole construction of a reel frame which is denoted by a reference numeral 10. The reel frame 10 is cylindrical in shape and has two open ends 12, 14. A spool shaft supporting plate 30 is detachably mounted on a mounting flange 16 of one open end 12 of the reel frame 10, and a plate for fixing a crank handle, which drives the spool, on the other open end 14.

A guide channel 20, in which a resilient plate spring 34 as a fixing member in the spool shaft supporting plate 30 is guided in a compressed state, is formed onto the open end 12 of the reel frame 10. The open end 12 has a plurality of circular recesses 18 positioned at predetermined intervals, through which the plate spring 34 is introduced into the guide channel 20. A snap portion 22 extending radially and outwardly from the guide channel 20 is formed between the circular recesses 18, so that the plate spring 34 can be returned to the original position in the guide channel 20.

Figure 2:
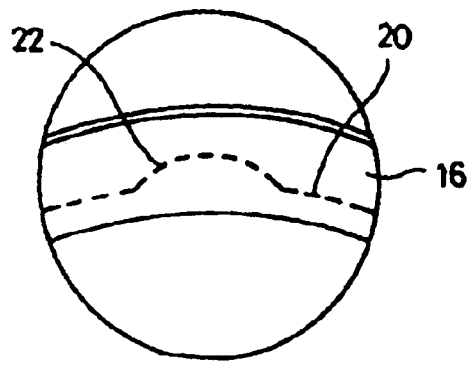
FIG. 2 is an enlarged plan view of the circle II in FIG. 1.
Figure 3:
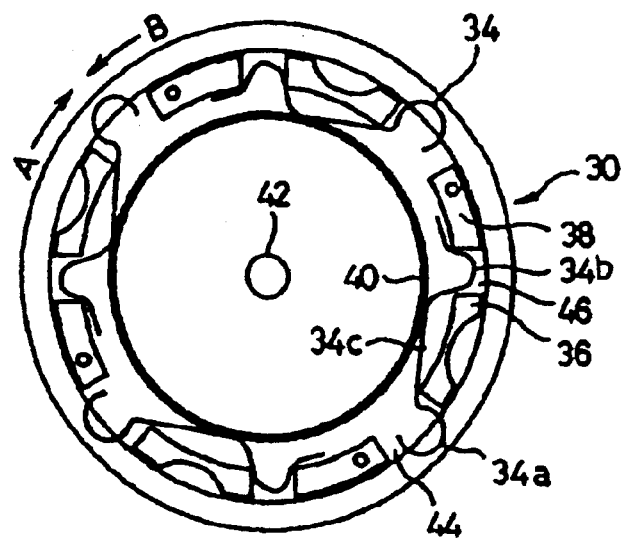
FIG. 3 is a plan view of the spool shaft supporting plate in FIG. 1, with a fixing plate (32) thereof eliminated

FIG. 2 and FIG. 3 show the spool shaft supporting plate 30 detachably mounted on the open end 12 of the reel frame 10. The plate 30 includes a plurality of plate springs 34 positioned on its side contacting the open end, and a fixing plate 32 fastened in its side by a screw so as to fix the plate spring 34 in a proper position.

The plate spring 34 comprises a circular head 34a in a gap 44, a fixing portion 34b positioned in another gap 46 to prevent the plate spring from laterally moving, and a resilient neck portion 34c connecting the head to the fixing portion. The plate spring 34 is so constructed that the head can be moved radially inward by the external force, and be returned to the original position thereof as soon as the external force is removed.

The respective plate spring 34 is fixed in position and its movement is limited by first and second bosses 36, 38. The first and second bosses 36, 38 are preferably protruded integrally from the spool shaft supporting plate. A gap 44 is formed between the firs: boss 36 and the second boss 38 adjacent to the first boss, through which the resilient head 34a of the spring 34 is protruded diametrically and outwardly from the spool shaft supporting plate.

In FIG. 3, the head 34a of the plate spring 34 is resiliently deformed inwardly of the gap 44 when the external force is applied thereto in the clockwise direction A and in a tangential direction. On the contrary, since the neck portion 34c is contacted with the first boss 36, the head 34a is not moved or deformed by the external force in the counterclockwise direction B and in the tangential direction. According to the above construction, the present spool shaft supporting plate is selected to be rotated in any direction within the open end of the reel frame.

A process of mounting/detaching the spool shaft-supporting plate (30) on/from the open end 12 of the reel frame 10 by a user will now be explained in detail.

The user holds the spool shaft supporting plate 30 by one hand, and the reel frame 10 by the other hand. Then, the plate 30 is disposed into the open end 12 of the reel frame 10 in such a manner that the head 34a of the plate spring 34 is positioned into the recess 18 of the open end 12. Upon rotating the spool shaft supporting plate in the clockwise direction A, the head 34a is contacted with the guide channel 20 formed onto the inner circumference of the open end 12, thus it is introduced radially inwardly of the channel.

In the state of being positioned into the guide channel 20, the head 34a is so resiliently deformed into the guide channel 20 that the spool shaft supporting plate 30 is not separated from the open end 12 of the reel frame 10. If the plate 30 is further rotated the head 34a of the plate spring is moved up to a snap portion 22 around the guide channel 20. Since the snap portion 22 is more extended in the radially and outward direction than the guide channel 20, the head 34a is returned to its original position in the snap portion 22. In this state, the plate 30 is fixedly fastened to the open end 12 of the reel frame 10.

When the plate 30 is further rotated in the clockwise direction, the head 34a is again moved up to the next recess 18 around the guide channel 20. Since the recess 18 is opened to the front of the open end 12 of the reel frame 10, the head 34a can be easily detached from the recess 18.

While the present invention has been described and illustrated herein with reference to the preferred embodiment thereof, it will be understood by those skilled in the art that various changes in form and details may be made therein without departing from the spirit and scope of the present invention.

What is claimed is:

1. A fly fishing reel having a reel frame, a spool disposed into the reel frame, and a spool shaft supporting plate detachably mounted on one open end of the reel frame, the reel frame comprising:

a radial guide channel in an inner circumference of the open end;

a plurality of recesses formed around the guide channel at predetermined intervals to interrupt the guide channel; and snap portions formed around the guide channel in radial and outward directions between the recesses;

wherein the spool shaft supporting plate includes a plurality of plate springs in one side contacting the open end of the reel frame, and each of the plate springs includes a circular head, a fixed portion for preventing a lateral movement of the plate spring, and a resilient neck portion for connecting the head to the fixed portion, the head being moved radially and inwardly by an external force, and being returned to an original position as soon as the external force is removed.

2. The fly fishing reel of claim 1, wherein the plate spring is fixed by first and second bosses provided in an open end of the spool shaft supporting plate.

3. The fly fishing reel of claim 2, wherein a gap is formed between the first boss and the second boss adjacent to the first boss.

4. The fly fishing reel of claim 3, wherein the head of the plate spring is protruded diametrically and outwardly from the spool shaft supporting plate through the gap, and moved into the gap if the external force is applied in a clockwise or counterclockwise direction.

* * * * *